(12) United States Patent
Konishi

(10) Patent No.: US 9,129,511 B2
(45) Date of Patent: Sep. 8, 2015

(54) PRESENCE DECIDING APPARATUS, SYSTEM, METHOD AND PROGRAM

(75) Inventor: Yusuke Konishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 600 days.

(21) Appl. No.: 13/516,314

(22) PCT Filed: Dec. 13, 2010

(86) PCT No.: PCT/JP2010/072323
§ 371 (c)(1),
(2), (4) Date: Jun. 15, 2012

(87) PCT Pub. No.: WO2011/074511
PCT Pub. Date: Jun. 23, 2011

(65) Prior Publication Data
US 2012/0253739 A1 Oct. 4, 2012

(30) Foreign Application Priority Data
Dec. 18, 2009 (JP) ................................ 2009-287111

(51) Int. Cl.
*G08B 13/00* (2006.01)
*G08B 21/22* (2006.01)
*G08B 13/14* (2006.01)
(Continued)

(52) U.S. Cl.
CPC *G08B 21/22* (2013.01); *G01V 8/20* (2013.01); *G08B 13/1436* (2013.01); *G08B 21/182* (2013.01)

(58) Field of Classification Search
CPC .. G08B 21/22; G08B 21/182; G08B 21/0236; G08B 13/1436; G08B 13/00; G08B 13/2402; G08B 13/2462; G08B 13/2488; G08B 21/0235
See application file for complete search history.

(56) References Cited

U.S. PATENT DOCUMENTS

| | | | |
|---|---|---|---|
| 2005/0270158 A1* | 12/2005 | Corbett | 340/572.1 |
| 2006/0219783 A1* | 10/2006 | Willis | 235/385 |
| 2008/0122635 A1* | 5/2008 | Fujikawa et al. | 340/573.1 |

(Continued)

FOREIGN PATENT DOCUMENTS

| | | |
|---|---|---|
| CN | 101546177 A | 9/2009 |
| CN | 101592923 A | 12/2009 |
| JP | 01-219690 A | 9/1989 |

(Continued)

OTHER PUBLICATIONS

Office Action dated Feb. 25, 2014, issued by the State Intellectual Property Office of P.R.C. in corresponding Chinese Application No. 201080056367.5.

*Primary Examiner* — Timothy H Hwang
(74) *Attorney, Agent, or Firm* — Sughrue Mion, PLLC

(57) ABSTRACT

The fact that a movable object exits a specific area is judged with high accuracy. A first movement sensor detects the movement of the movable object in a first area. A second movement sensor detects the movement of the movable object in a second area including the first area. A time judgment unit judges whether or not a time difference from a time point when a measurement value obtained by the first movement sensor becomes a predetermined value or less to a time point when a measurement value obtained by the second movement sensor becomes the predetermined value or less is a first threshold value or more. An existence judgment unit judges that the movable object does not exist in the first area in the case where the time judgment unit has judged that the time difference is the first threshold value or more.

19 Claims, 15 Drawing Sheets

(51) Int. Cl.
  *G01V 8/20*   (2006.01)
  *G08B 21/18*  (2006.01)

(56) References Cited

U.S. PATENT DOCUMENTS

2010/0315509 A1* 12/2010 Blanch Puig et al. ......... 348/154

FOREIGN PATENT DOCUMENTS

| JP | 02-272330 A  |   | 11/1990 |
|----|--------------|---|---------|
| JP | 08-146149 A  |   | 6/1996  |
| JP | 10-153656 A  |   | 6/1998  |
| JP | 10213671 A   | * | 8/1998  |
| JP | 2004-309051 A|   | 11/2004 |

* cited by examiner

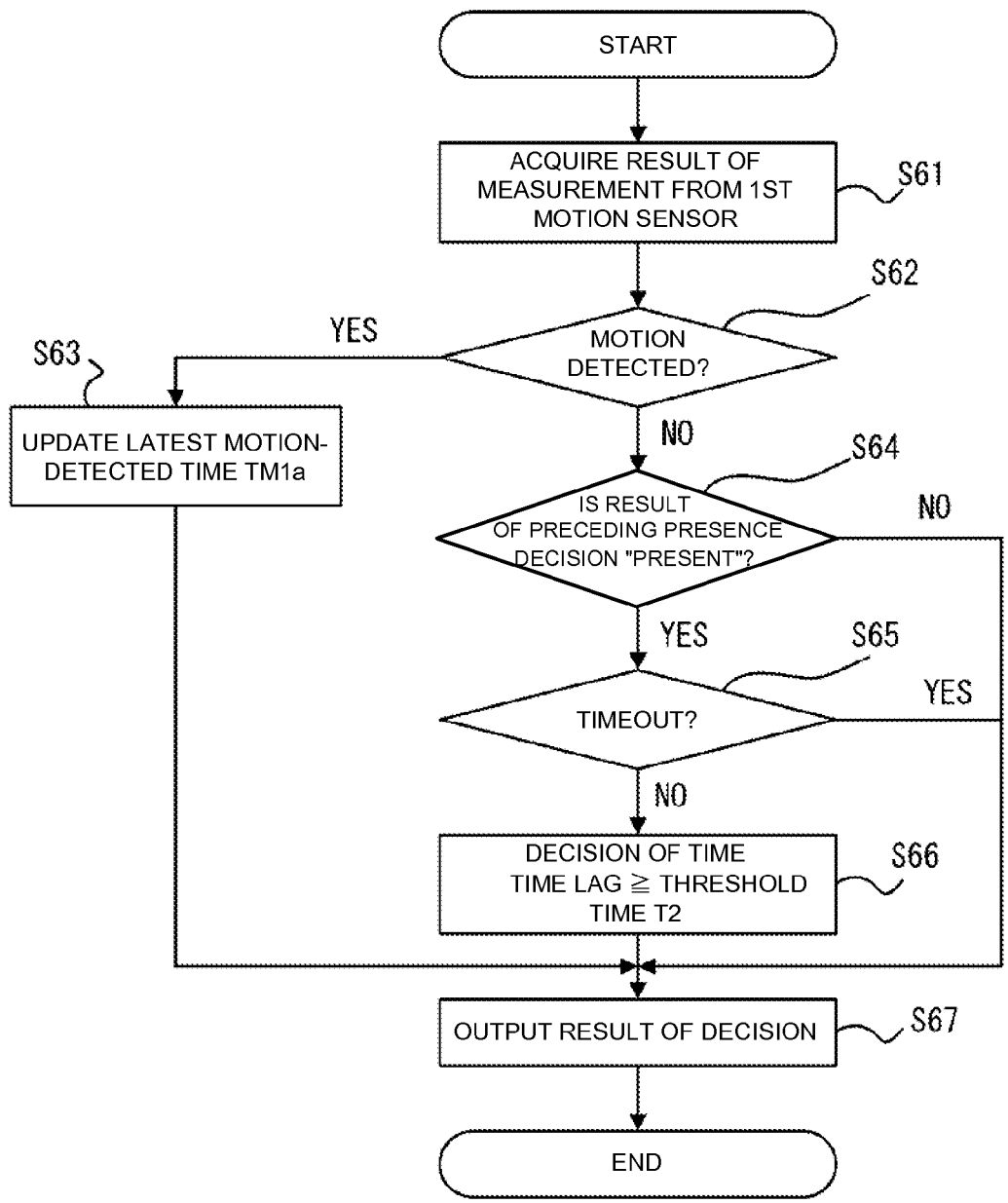

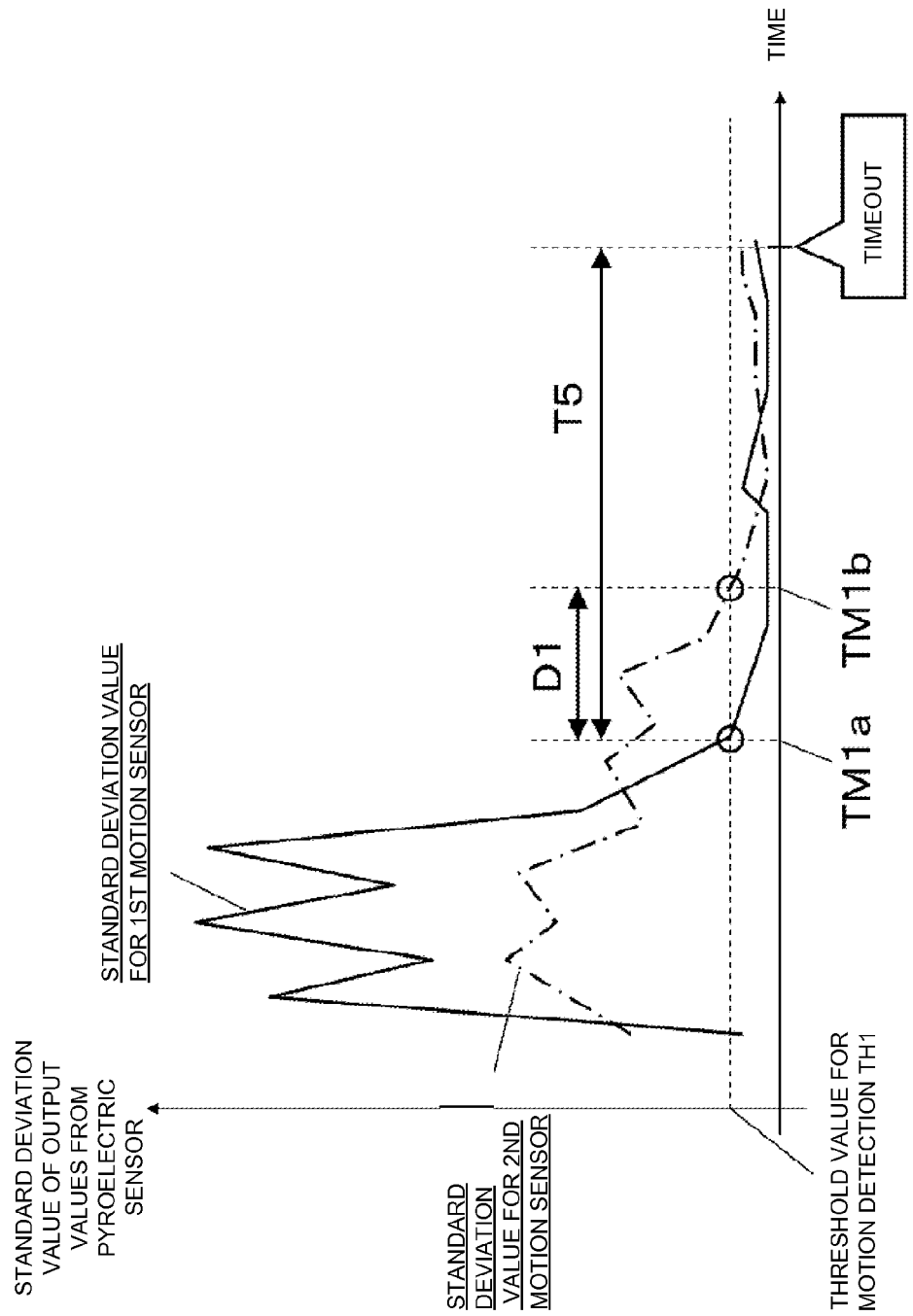

PRESENCE DECIDING APPARATUS, SYSTEM, METHOD AND PROGRAM

CROSS REFERENCE TO RELATED APPLICATIONS

This application is a National Stage of International Application No. PCT/JP2010/072323 filed Dec. 13, 2010, claiming priority based on Japanese Patent Application No. 2009-287111, filed Dec. 18, 2009, the contents of all of which are incorporated herein by reference in their entirety.

TECHNICAL FIELD

The present invention relates to an apparatus for deciding whether or not a mobile object is present in a specific area.

BACKGROUND ART

There have been proposed several apparatuses for deciding the presence of a mobile object in a specific area using a motion detection sensor such as a pyroelectric sensor.

For example, PTL 1 discloses an apparatus for deciding the intrusion and leaving of a mobile object by providing different detection areas with respective corresponding detector elements, and deciding the intrusion and leaving from the temporal relations of detected signals output by the detector elements. PTL 2 discloses an apparatus that starts a timer counter when motion is no longer detected by a human body sensor, and turns off an electric device after a certain period of time has passed.

CITATION LIST

Patent Literature

PTL 1: JP P8-146149A
PTL 2: JP P2004-309051A

SUMMARY OF INVENTION

Technical Problem

The apparatus in PTL 1, however, has a problem that it cannot detect the presence of a mobile object in a case that the mobile object stays at an interstice between detection areas because the detection areas are disposed adjacent to each other. The apparatus in PTL 2 turns off an electric device after a certain period of time has passed since motion was last detected by a sensor; such timeout processing, however, gives rise to a long delay from when the mobile object was actually no longer in the area to when the system is turned off.

The present invention has been made in view of such a problem, and its objective is to provide presence deciding apparatus, system, method and program capable of deciding that a mobile object has left a specific area with high precision.

Solution to Problem

The present invention provides a presence deciding apparatus comprising: a time deciding section for deciding whether or not a time lag is equal to or greater than a first threshold value, the time lag being a period of time from when a measured value indicating motion of a mobile object in a first area reaches down to or below a predetermined value to when a measured value indicating motion of a mobile object in a second area including said first area reaches down to or below a predetermined value; and a presence deciding section for deciding that no mobile object is present in said first area in a case that it is decided by said time deciding section that said time lag is equal to or greater than said first threshold value.

The present invention provides a presence deciding system comprising: a first motion sensor for detecting motion of a mobile object in a first area; a second motion sensor for detecting motion of a mobile object in a second area including said first area; a time deciding section for deciding whether or not a time lag is equal to or greater than a first threshold value, the time lag being a period of time from when a value measured by the first motion sensor reaches down to or below a predetermined value to when a value measured by the second motion sensor reaches down to or below a predetermined value; and a presence deciding section for deciding that no mobile object is present in said first area in a case that it is decided by said time deciding section that said time lag is equal to or greater than said first threshold value.

The present invention provides a presence deciding method comprising: deciding whether or not a time lag is equal to or greater than a first threshold value, the time lag being a period of time from when a measured value indicating motion of a mobile object in a first area reaches down to or below a predetermined value to when a measured value indicating motion of a mobile object in a second area including said first area reaches down to or below a predetermined value; and deciding that no mobile object is present in said first area in a case that it is decided that said time lag is equal to or greater than said first threshold value.

The present invention provides a program for causing a computer connected with a first motion sensor for detecting motion of a mobile object in a first area and a second motion sensor for detecting motion of a mobile object in a second area including said first area to implement: a time deciding function for deciding whether or not a time lag is equal to or greater than a first threshold value, the time lag being a period of time from when a value measured by the first motion sensor reaches down to or below a predetermined value to when a value measured by the second motion sensor reaches down to or below a predetermined value; and a presence deciding function for deciding that no mobile object is present in said first area in a case that it is decided by said time deciding function that said time lag is equal to or greater than said first threshold value.

Advantageous Effects of Invention

According to the present invention, it is possible to decide that a mobile object has left a specific area with high precision.

BRIEF DESCRIPTION OF DRAWINGS

FIG. 14 is a flow chart for explaining an operation of the presence deciding apparatus in the fifth embodiment.

FIG. 15 is a diagram for explaining an operation of the presence deciding apparatus in the fifth embodiment.

DESCRIPTION OF EMBODIMENTS

Now several embodiments of the present invention will be described with reference to the accompanying drawings. The presence deciding apparatus in accordance with the present invention is for deciding whether or not a mobile object has left a specific area.

<First Embodiment>

Figure 1:
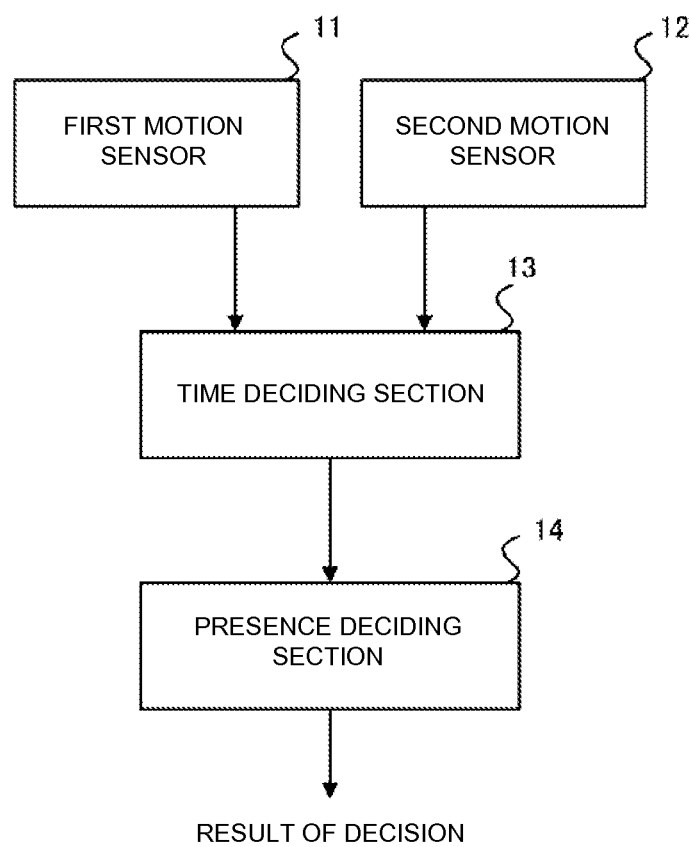
FIG. 1 is a block diagram of a presence deciding apparatus in accordance with a first embodiment of the present invention.

A first embodiment of the present invention will be described below with reference to the accompanying drawings. FIG. 1 is a block diagram of a presence deciding apparatus in accordance with the first embodiment of the present invention. The presence deciding apparatus in accordance with the first embodiment comprises a first motion sensor 11, a second motion sensor 12, a time deciding section 13, and a presence deciding section 14.

The first motion sensor 11 detects motion of a mobile object in a specific area (referred to as a first area hereinbelow).

The second motion sensor 12 detects motion of a mobile object in a second area that includes the first area and is larger than the first area.

For the first and second motion sensors 11, 12, a pyroelectric sensor, an indoor compact radar, and a vibration sensor may be employed, for example. It should be noted that the locations to install the first and second motion sensors 11, 12 are not limited to positions within the respective areas insofar as the second area covered for detection by the second motion sensor 12 includes the first area covered for detection by the first motion sensor 11.

Figure 2:
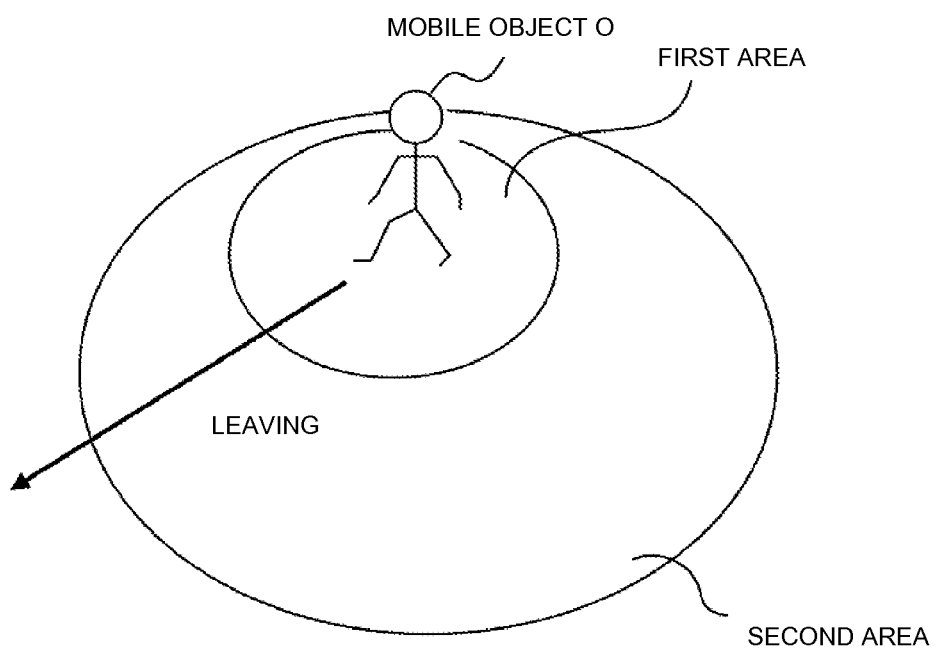
FIG. 2 is a diagram for explaining a scene in which a mobile object is leaving a first area.

The time deciding section 13 decides whether or not a time lag D1 is equal to or greater than a threshold time T2, the time lag D1 being a period of time from when a value measured by the first motion sensor 11 reaches down to or below a predetermined value to when a value measured by the second motion sensor 12 reaches down to or below a predetermined value. By considering when the value measured by each sensor reaches down to or below a predetermined value as when a mobile object is no longer detected in the area corresponding to the sensor, it is possible to decide whether or not the mobile object has left the first area by deciding whether or not a time T1b is behind a time T1a by a threshold time T2 or more, where T1b represents a time at which a mobile object is no longer detected in the second area, and T1a represents a time at which a mobile object is no longer detected in the first area. This is based on the concept that when a mobile object O is leaving the first area, as shown in FIG. 2, the time at which motion of the mobile object is no longer detected by the second motion sensor 12 is always behind the time at which motion is no longer detected by the first motion sensor 11 because it is always after the mobile object O left the first area that the mobile object O passes through the second area and leaves there.

In a case that a result of the decision by the time deciding section 13 indicates that the time lag D1 is equal to or greater than the threshold time T2, the presence deciding section 14 decides that no mobile object is present in the first area.

The threshold time T2 may be a predefined fixed value, or a value varying depending upon the strength of motion detected by the sensor. By changing the threshold time T2 to a lower value for stronger motion detected by the first or second motion sensor 11, 12, and changing it to a higher value for weaker motion, the threshold time T2 can be set depending upon the moving velocity of the mobile object O, which improves precision of decision about leaving from the first area.

Figure 3:
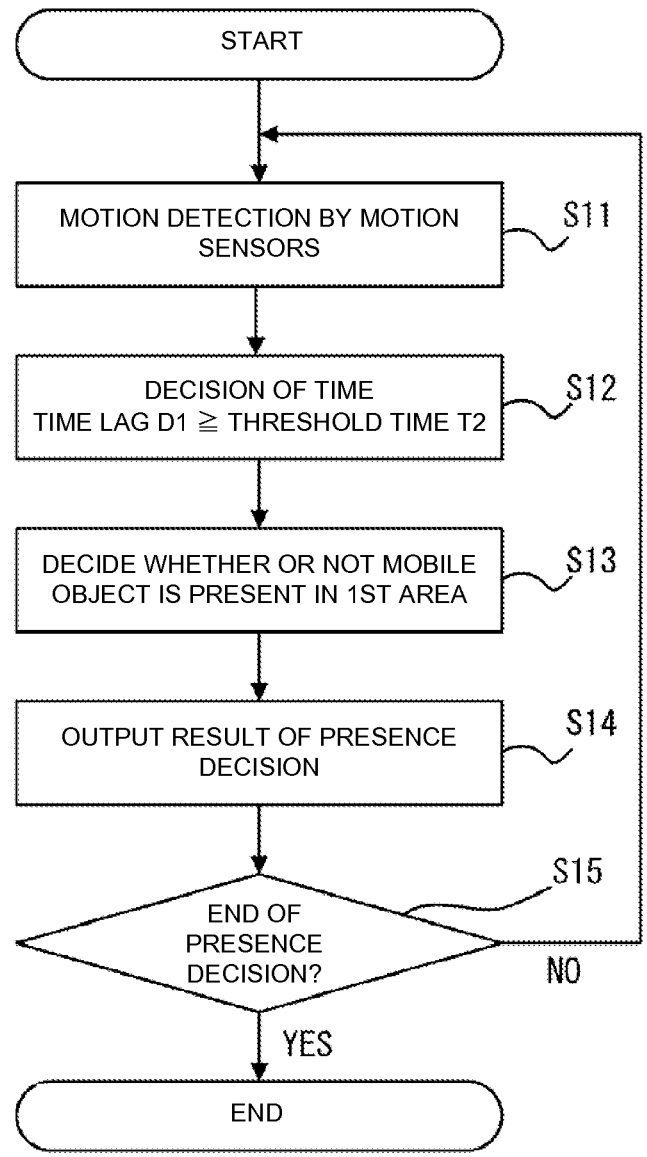
FIG. 3 is a flow chart for explaining an operation of the presence deciding apparatus in the first embodiment.

Next, an operation of the presence deciding apparatus in the first embodiment will be described with reference to a flow chart in FIG. 3.

The first and second motion sensors 11, 12 periodically perform measurement to detect motion (Step S11). Results of the measurement by the first and second motion sensors 11, 12 are stored in a memory area by the time deciding section 13.

The time deciding section 13 decides whether or not a time lag D1 is equal to or greater than a threshold time T2 based on the results of the measurement by the sensors, the time lag D1 being obtained by subtracting a time T1a at which a value measured by the first motion sensor 11 reaches down to or below a predetermined value from a time T1b at which a value measured by the second motion sensor 12 reaches down to or below a predetermined value (Step S12).

The presence deciding section 14 decides whether a mobile object is present in the first area based on a result of the decision by the time deciding section 13 (Step S13). In particular, in a case that the result of the decision by the time deciding section 13 indicates that the time lag D1 is equal to or greater than the threshold time T2, it decides that no mobile object is present in the first area; otherwise, it decides that a mobile object is present in the first area.

The presence deciding section 14 outputs the result of the decision at Step 13 (Step S14).

Then, in a case that the decision about the presence of a mobile object is to be terminated, the processing is terminated (Step S15: YES), or in a case that the decision is to be continued, the flow goes back to Step S11 (Step S15: NO).

As described above, according to the present embodiment, it is possible to decide that no mobile object is present in a specific area with high precision by deciding whether or not a time lag D1 is equal to or greater than a threshold time T2, the time lag D1 being a period of time from when motion is no longer detected in the specific area to when motion is no longer detected in the second area including the specific area.

It should be noted that in a case that the result of the decision by the time deciding section 13 indicates that the time lag D1 is equal to or greater than the threshold time T2, the presence deciding section 14 may decide that no mobile object is present in the first area when the values measured by the first and second motion sensors 11, 12 are equal to or smaller than a predetermined value over a preset certain period of time.

Figure 4:
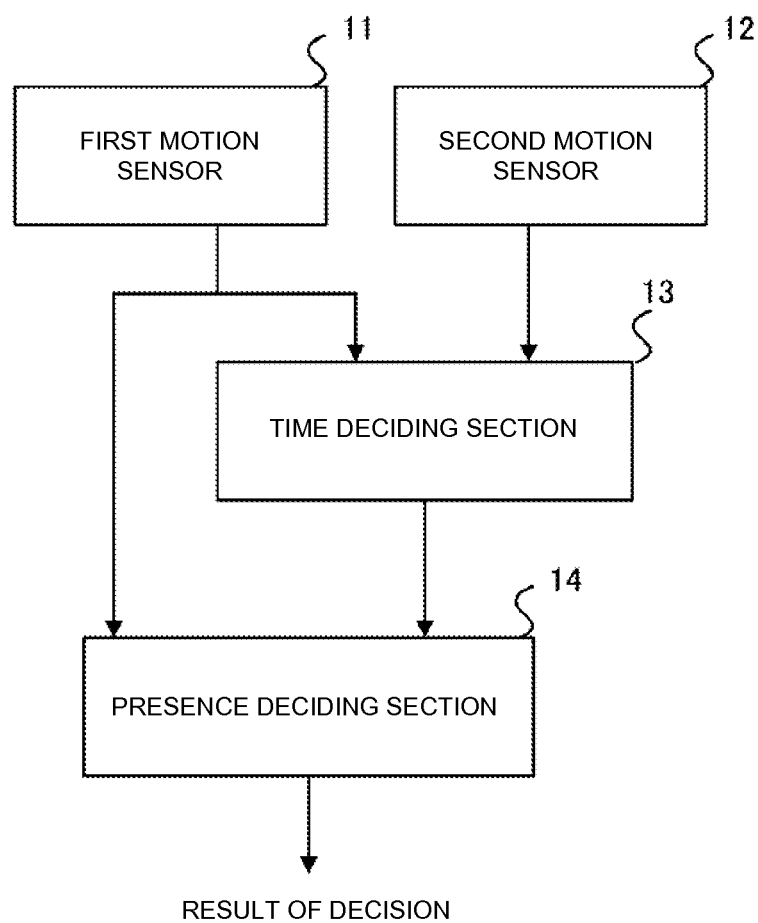
FIG. 4 is a block diagram of the presence deciding apparatus in a variation of the first embodiment.

In a variation of the first embodiment, the presence decision processing for deciding whether or not a mobile object is present in a specific area may be combined with timeout processing. A block diagram of the presence deciding apparatus in this case is shown in FIG. 4. The presence deciding section 14 in the variation decides that no mobile object is present in the first area in a case that a predetermined timeout period T3 has elapsed from the time at which the value measured by the first motion sensor 11 reaches down to or below a predetermined value, and in a case that it is decided by the time deciding section 13 that the time lag D1 is equal to or greater than the threshold time T2 before the timeout period T3 has elapsed. Thus, it is possible to decide that a mobile object has left a specific area more accurately.

<Second Embodiment>

Figure 5:
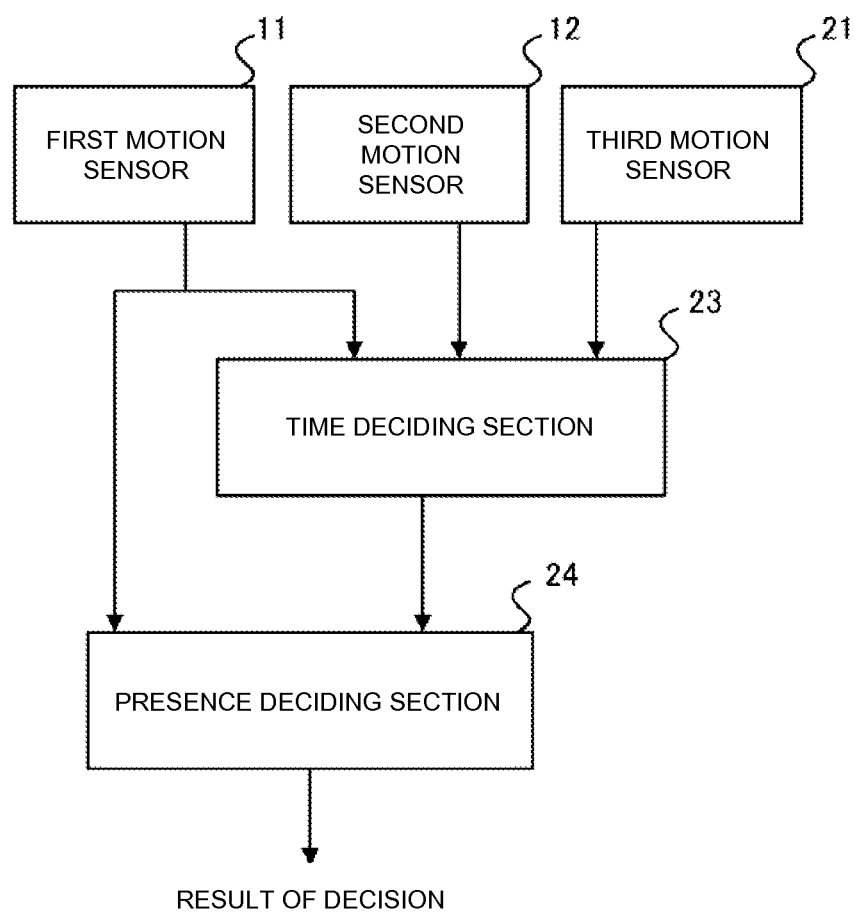
FIG. 5 is a block diagram of a presence deciding apparatus in accordance with a second embodiment of the present invention.

Next, a presence deciding apparatus in accordance with a second embodiment will be described below. FIG. 5 is a block diagram of the presence deciding apparatus in accordance with the second embodiment of the present invention. In this embodiment, portions having similar functions to those in the first embodiment are designated by similar symbols and explanation thereof will be omitted.

A third motion sensor 21 detects motion of a mobile object in a third area that further includes the second area and is larger than the second area. For the third motion sensor 21, a pyroelectric sensor, an indoor compact radar, and a vibration sensor may be employed, for example. The location to install the third motion sensor 21 is not limited to a position within the third area insofar as the third area covered for detection by the third motion sensor 21 includes the second area covered for detection by the second motion sensor 12.

The time deciding section 23 decides whether or not a time lag D1 is equal to or greater than a threshold time T2, and decides whether or not a time lag D2 is equal to or greater than a threshold time T4 (second threshold value), the time lag D1 being a period of time from when a value measured by the first motion sensor 11 reaches down to or below a predetermined value to when a value measured by the second motion sensor 12 reaches down to or below a predetermined value, and the time lag D2 being a period of time from when a value measured by the first motion sensor 11 reaches down to or below a predetermined value to when a value measured by the third motion sensor 21 reaches down to or below a predetermined value.

The presence deciding section 24 decides that no mobile object is present in the first area in a case that a predetermined timeout period T3 has elapsed from a time at which the value measured by the first motion sensor 11 reaches down to or below a predetermined value, and in a case that the result of the decision by the time deciding section 23 indicates that the time lag D1 is equal to or greater than the threshold time T2 and the time lag D2 is equal to or greater than the threshold time T4 before the timeout period T3 has elapsed. It should be noted that the threshold time T4 may be a predefined fixed value, or a value varying depending upon the strength of motion detected by the sensor. By changing the threshold time T4 to a lower value for stronger motion detected by the first or third motion sensor 11, 21, and changing it to a higher value for weaker motion, the threshold time T4 can be set depending upon the moving velocity of the mobile object O, which improves precision of decision about leaving from the first area.

Figure 6:
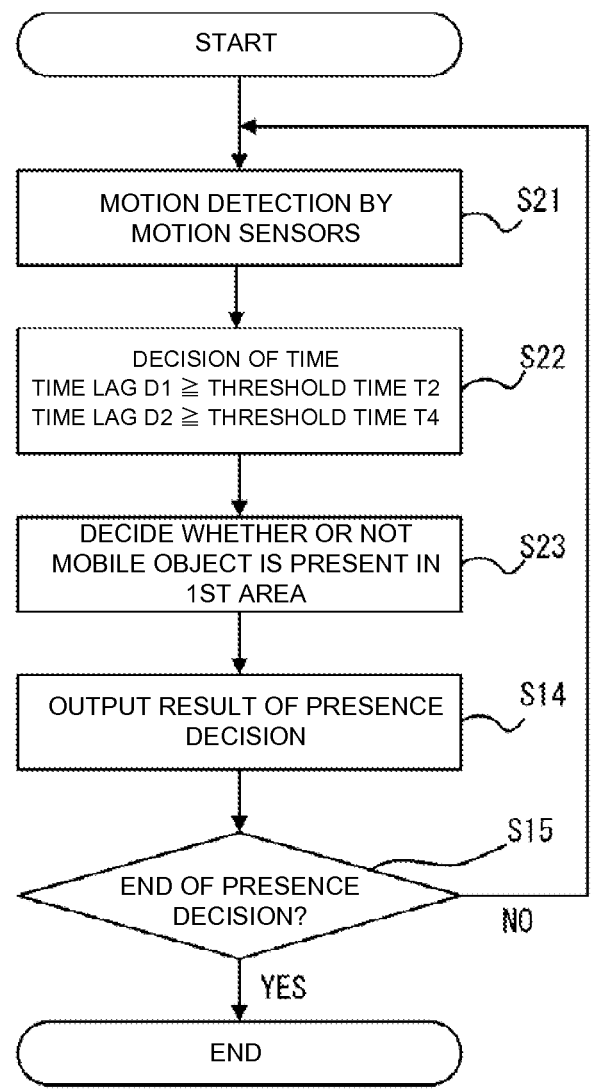
FIG. 6 is a flow chart for explaining an operation of the presence deciding apparatus in the second embodiment.

Next, an operation of the presence deciding apparatus in the second embodiment will be described with reference to a flow chart in FIG. 6. It should be noted that similar operations to those in the first embodiment are designated by similar symbols and explanation thereof will be omitted.

The first, second, and third motion sensors 11, 12, 21 periodically perform measurement to detect motion (Step S21). Results of the measurement by the first, second, and third motion sensors 11, 12, 21 are supplied to the time deciding section 23. The time deciding section 23 stores the results of the measurements from the sensors in a memory area. The result of the measurement by the first motion sensor 11 is also supplied to the presence deciding section 24.

Next, the time deciding section 23 decides whether or not a time lag D1 is equal to or greater than a threshold time T2 and whether or not a time lag D2 is equal to or greater than a threshold time T4 based on the results of the measurement by the sensors, the time lag D1 being obtained by subtracting a time T1$a$ at which a value measured by the first motion sensor 11 reaches down to or below a predetermined value from a time T1$b$ at which a value measured by the second motion sensor 12 reaches down to or below a predetermined value, and the time lag D2 being obtained by subtracting the time T1$a$ at which a value measured by the first motion sensor 11 reaches down to or below a predetermined value from a time T1$c$ at which a value measured by the third motion sensor 21 reaches down to or below a predetermined value (Step S22).

The presence deciding section 24 decides whether a mobile object is present in the first area based on the result of the measurement by the first motion sensor 11, and on a result of the decision by the time deciding section 23 (Step S23). In particular, in a case that a timeout period T3 has elapsed from the time at which the value measured by the first motion sensor 11 reaches down to or below a predetermined value, the section 24 decides that no mobile object is present in the first area. When the timeout period T3 has not passed yet, the section 24 decides that no mobile object is present in the first area in a case that the result of the decision from the time deciding section 23 indicates that the time lag D1 is equal to or greater than the threshold time T2 and the time lag D2 is equal to or greater than the threshold time T4; otherwise, the section 24 decides that a mobile object is present in the first area.

As described above, according to the present embodiment, a result of detection by the third motion sensor 21 covering for detection a third area is additionally used in presence decision, which further improves precision of the result of decision.

While the presence deciding section 24 is configured to decide that no mobile object is present in the first area when satisfying both the conditions, one that the time lag D1 is equal to or greater than the threshold time T2, and the other that the time lag D2 is equal to or greater than the threshold time T5 in the preceding description, the present invention is not limited thereto, and the section 24 may decide that no mobile object is present in the first area when at least one of these conditions is satisfied.

Moreover, in a case that the aforementioned conditions for decision about the time lag D1 and time lag D2 are satisfied, the presence deciding section 24 may decide that no mobile object is present in the first area when the values measured by the first, second, and third motion sensors 11, 12, 21 are equal to or smaller than a predetermined value over a preset certain period of time.

Furthermore, decision about the presence of a mobile object in the first area may be performed using four or more motion sensors in a manner similar to the above.

<Third Embodiment>

Figure 7:
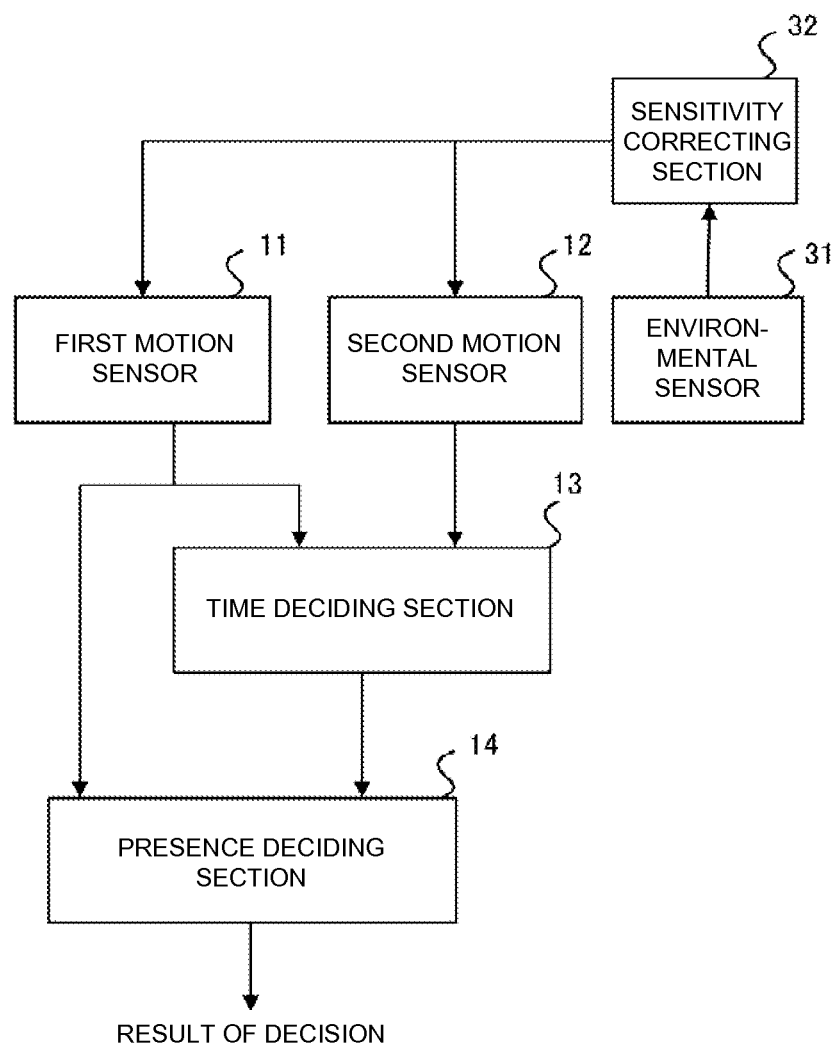
FIG. 7 is a block diagram of a presence deciding apparatus in accordance with a third embodiment of the present invention.

Next, a presence deciding apparatus in accordance with a third embodiment will be described below. FIG. 7 is a block diagram of the presence deciding apparatus in accordance with the third embodiment of the present invention. In this embodiment, portions having similar functions to those in the first embodiment are designated by similar symbols and explanation thereof will be omitted.

An environmental sensor 31 performs measurement for correcting sensitivity variation of the first and second motion sensors 11, 12 due to environmental factors. In a case that a pyroelectric sensor is used for the first and second motion sensors 11, 12, a temperature sensor or an illuminance sensor is employed as the environmental sensor 31. This is because sensitivity of a pyroelectric sensor varies depending upon environmental factors such as temperature, illuminance, and the like.

A sensitivity correcting section 32 applies sensitivity correction to the first and second motion sensors 11, 12 based on a result of the measurement by the environmental sensor 31. For the environmental sensor 31 employing a temperature sensor, sensitivity of the first and second motion sensors 11, 12 is set higher when the temperature measured by the environmental sensor 31 is higher than a predetermined upper limit value; or sensitivity of the first and second motion sensors 11, 12 is set lower when the temperature measured by the environmental sensor 31 is lower than a predetermined lower limit value. Alternatively, for the environmental sensor 31 employing an illuminance sensor, sensitivity of the first and second motion sensors 11, 12 is set higher when the illuminance measured by the environmental sensor 31 is higher than a predetermined upper limit value; or sensitivity of the first and second motion sensors 11, 12 is set lower when the illuminance measured by the environmental sensor 31 is lower than a predetermined lower limit value.

Figure 8:
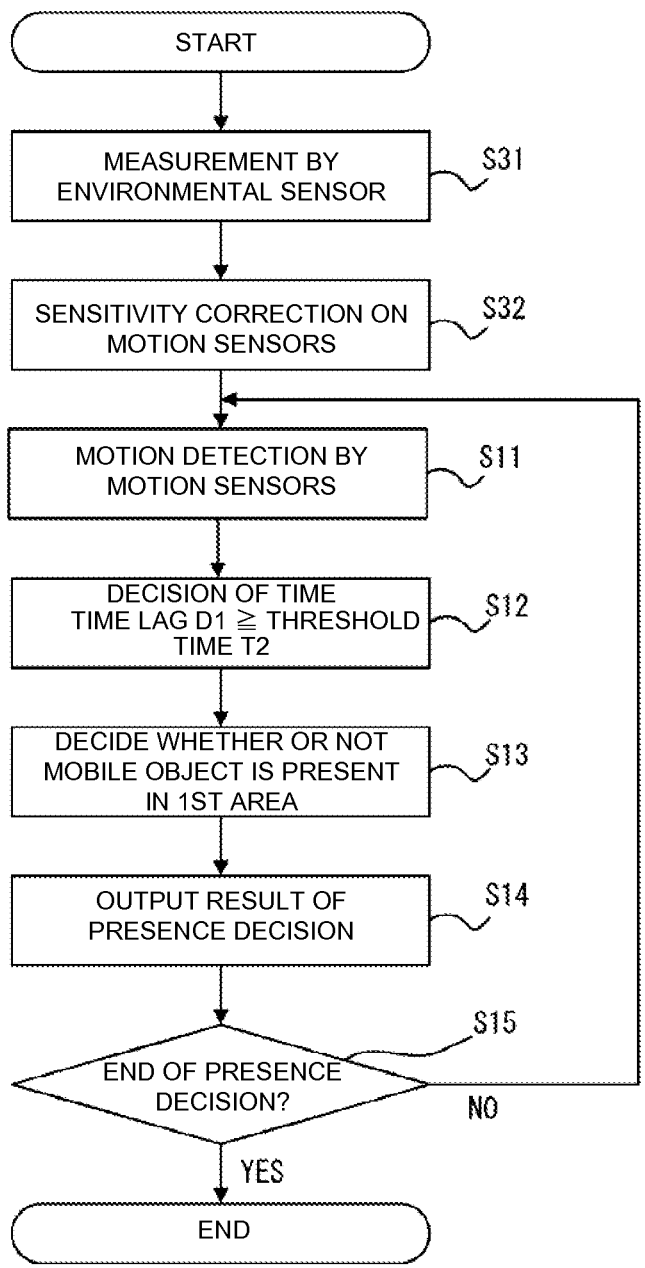
FIG. 8 is a flow chart for explaining an operation of the presence deciding apparatus in the third embodiment.

Next, an operation of the presence deciding apparatus in the third embodiment will be described with reference to a flow chart in FIG. 8. It should be noted that similar operations to those in the first embodiment are designated by similar symbols and explanation thereof will be omitted.

The environmental sensor 31 periodically performs measurement (Step S31). A result of the measurement by the environmental sensor 31 is supplied to the sensitivity correcting section 32.

The sensitivity correcting section 32 applies necessary sensitivity correction to the first and second motion sensors 11, 12 based on the result of the measurement by the environmental sensor 31 (Step S32). In particular, the sensitivity correcting section 32 decides whether or not a measured value acquired from the environmental sensor 31 falls within a predetermined range, and in a case that it falls within the predetermined range, no sensitivity correction will be made. When the value measured by the environmental sensor 31 is higher than a preset upper limit value, sensitivity of the first and second motion sensors 11, 12 is set higher; or when the measured value is lower than a preset lower limit value, sensitivity of the first and second motion sensors 11, 12 is set lower.

As described above, according to the present embodiment, sensitivity variation of the first and second motion sensors 11, 12 due to environmental factors can be corrected to thereby decide that no mobile object is present in a specific area with high precision.

<Fourth Embodiment>

Figure 9:
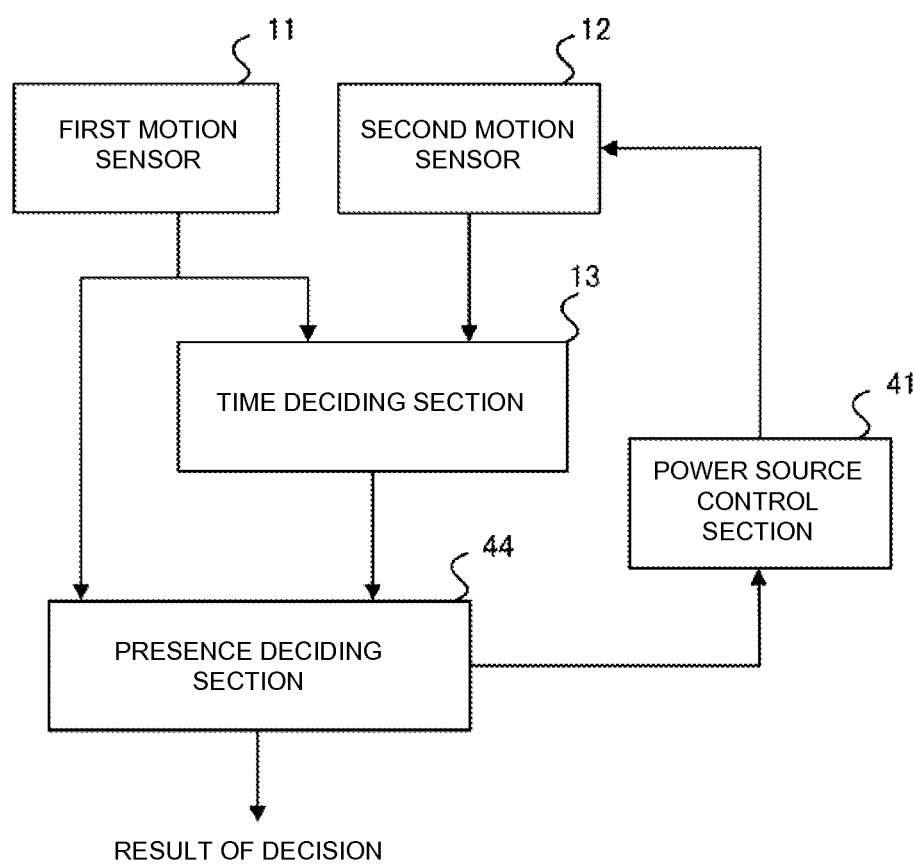
FIG. 9 is a block diagram of a presence deciding apparatus in accordance with a fourth embodiment of the present invention.

Next, a presence deciding apparatus in accordance with a fourth embodiment will be described below. FIG. 9 is a block diagram of the presence deciding apparatus in accordance with the fourth embodiment of the present invention. In this embodiment, portions having similar functions to those in the first embodiment are designated by similar symbols and explanation thereof will be omitted.

Once a result of decision that no mobile object is present in the first area has been supplied from the presence deciding section 44, a power source control section 41 disconnects a power source(s) for a motion sensor(s) (second motion sensor 12) except the first motion sensor 11.

The presence deciding section 44 decides whether or not a mobile object is present in the first area as in the first embodiment, and outputs a result of the decision and supplies it to the power source control section 41.

Figure 10:
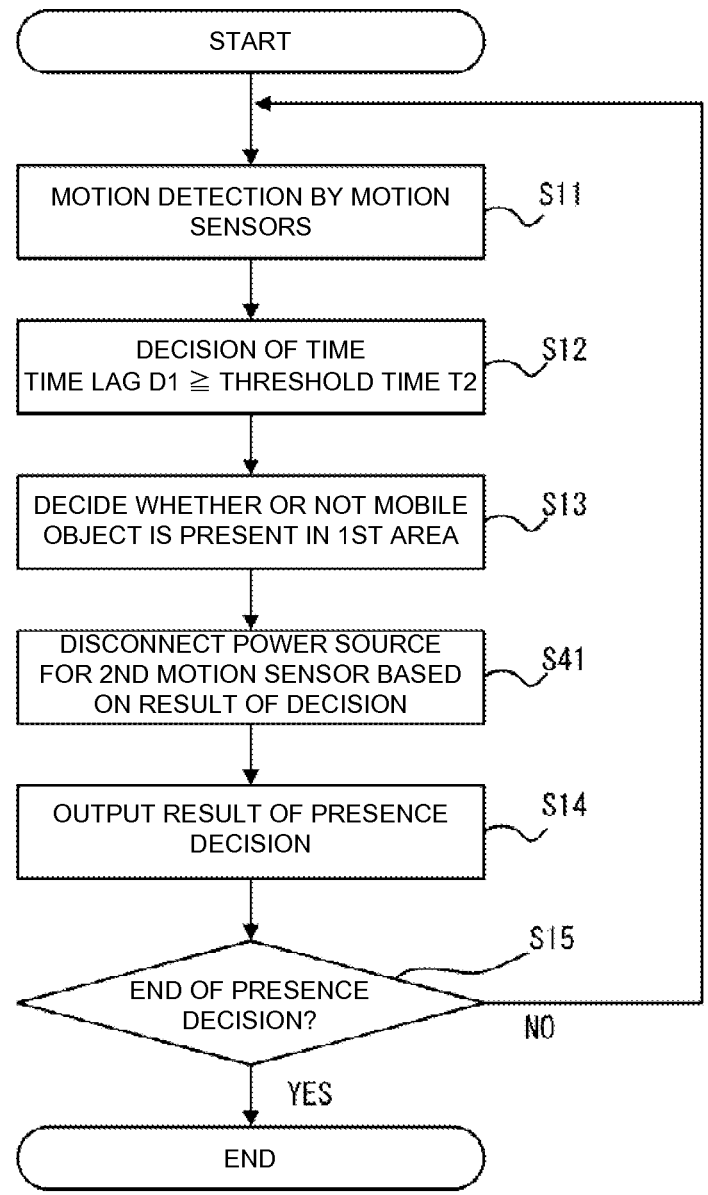
FIG. 10 is a flow chart for explaining an operation of the presence deciding apparatus in the fourth embodiment.

Next, an operation of the presence deciding apparatus in the fourth embodiment will be described with reference to a flow chart in FIG. 10. It should be noted that similar operations to those in the first embodiment are designated by similar symbols and explanation thereof will be omitted.

The presence deciding section 24 inputs a result of the decision at Step S13 to the power source control section. The power source control section 41 performs necessary disconnection of a power source(s) for a motion sensor(s) except the first motion sensor based on the result of the decision (Step S41). In particular, in a case that the result of the decision indicates that no mobile object is present in the first area, the section 41 disconnects a power source for the second motion sensor 12; or in a case that the result of the decision indicates that a mobile object is present in the first area, the section 41 does not perform power source disconnection.

Thus, in a case that it is decided that no mobile object is present in the first area, motion detection by the second motion sensor 12 will be needed no longer, so that a power source(s) for an unnecessary sensor(s) is disconnected to reduce power consumption.

In a case that a mobile object re-enters the first area after leaving there once, the first motion sensor 11 detects this. The power source control section 24 may turn on the power source for the second motion sensor 12 again in response to the detection.

<Fifth Embodiment>

Next, a fifth embodiment will be described with reference to the accompanying drawings. The fifth embodiment is an implementation of the presence deciding apparatus in the first embodiment provided above by a computer. The presence deciding apparatus in accordance with the present embodiment is for deciding whether or not a user is present in front of a computer.

Figure 11:
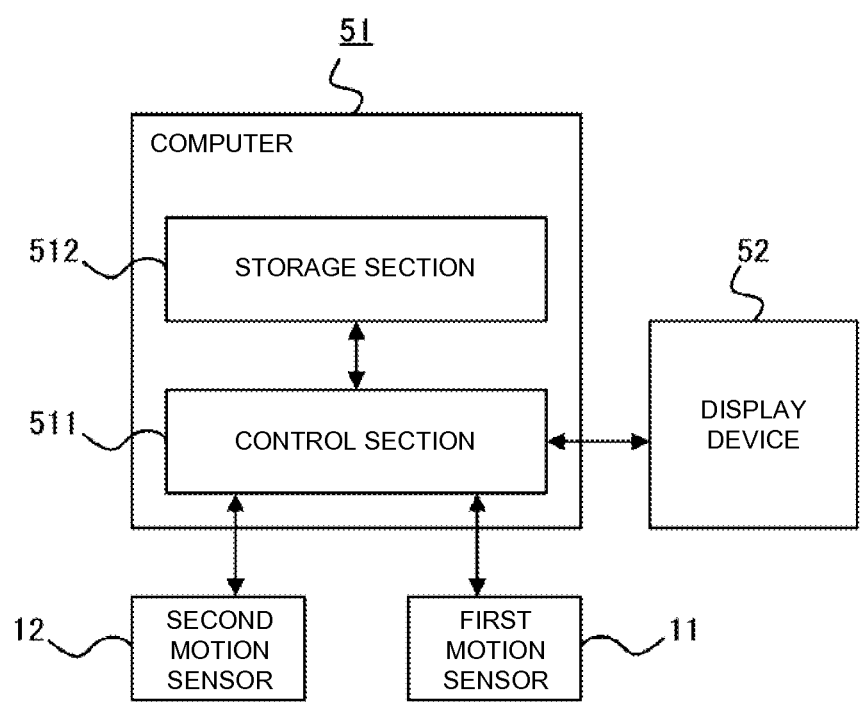
FIG. 11 is a diagram of a configuration of a presence deciding apparatus in accordance with a fifth embodiment of the present invention.

FIG. 11 is a diagram of a configuration of the presence deciding apparatus in accordance with the present embodiment. The presence deciding apparatus comprises a computer 51, a display device 52 such as a liquid crystal display, a first motion sensor 11, and a second motion sensor 12.

The computer 51 comprises a control section 511 including a CPU (Central Processing Unit), a ROM (Read Only Memory), a RAM (Random Access Memory), etc., and a storage section 512 including a hard disk device, etc. The control section 511 in the computer 51 logically implements the time deciding section 13 and presence deciding section 14 by loading an operating program etc. stored beforehand in the storage section 512 and executing it.

The first motion sensor 11 is disposed to have its coverage for detection around a front zone of the computer 51 (first area). The second motion sensor 12 is disposed to have its coverage for detection in an area (second area) including the coverage for detection of the first motion sensor 11. The first and second motion sensors 11, 12 are implemented by, for example, a pyroelectric sensor that measures motion of a heat source at a measurement frequency of 30 Hz and outputs a result.

Figure 12:
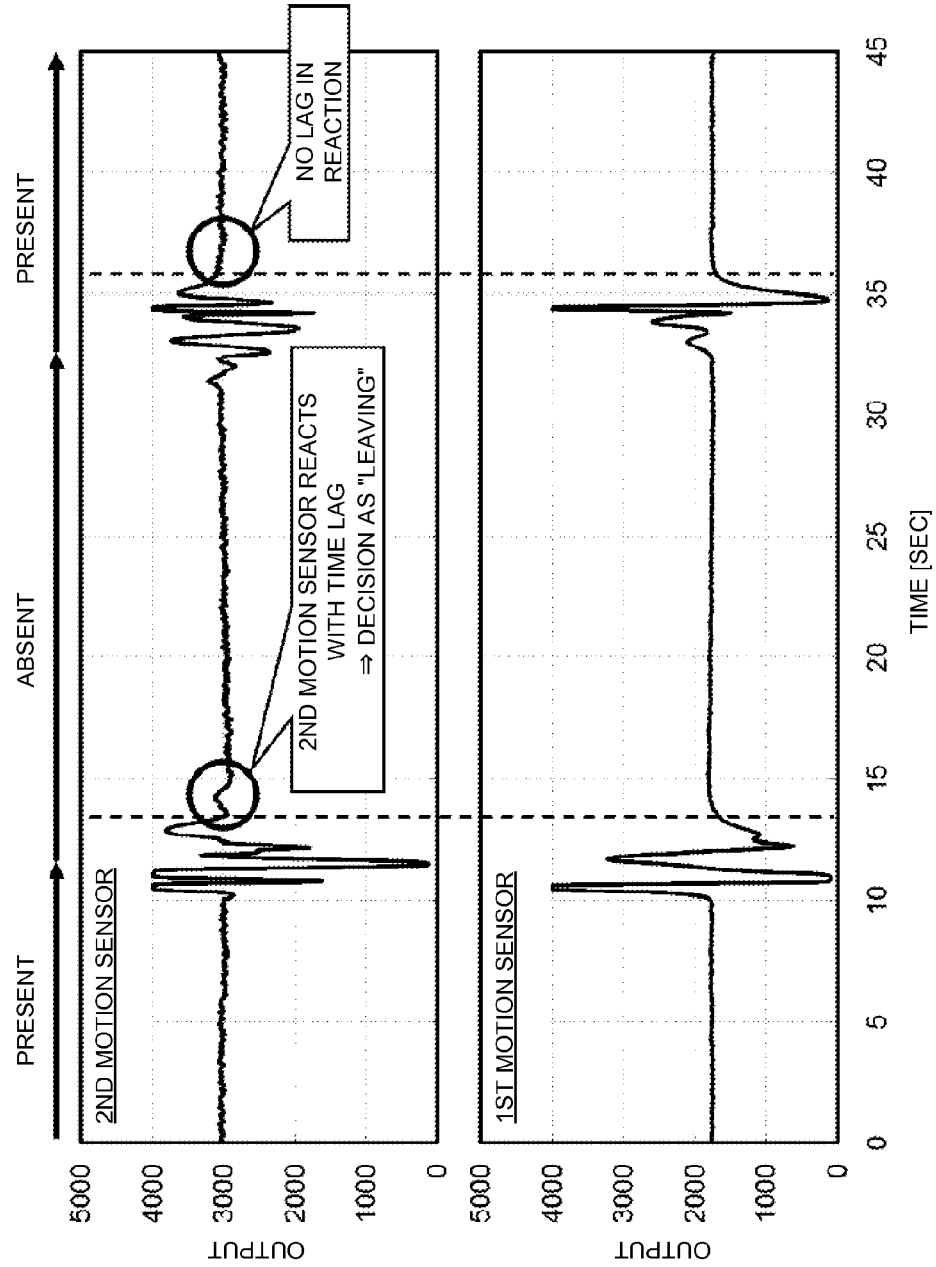
FIG. 12 is a diagram illustrating output values acquired by first and second motion sensors.

FIG. 12 shows output values actually acquired by the first and second motion sensors 11, 12, where a user leaves the vicinity of a front zone of a computer to a farther location, and comes back again to the front zone of the computer. It can also be seen from FIG. 12 that leaving of a mobile object from a specific area can be decided based on a time lag in reaction between the first and second motion sensors 11, 12 having different coverage for detection.

Next, an operation of the presence deciding apparatus in the fifth embodiment will be described with reference to FIGS. 13-15.

Figure 13:
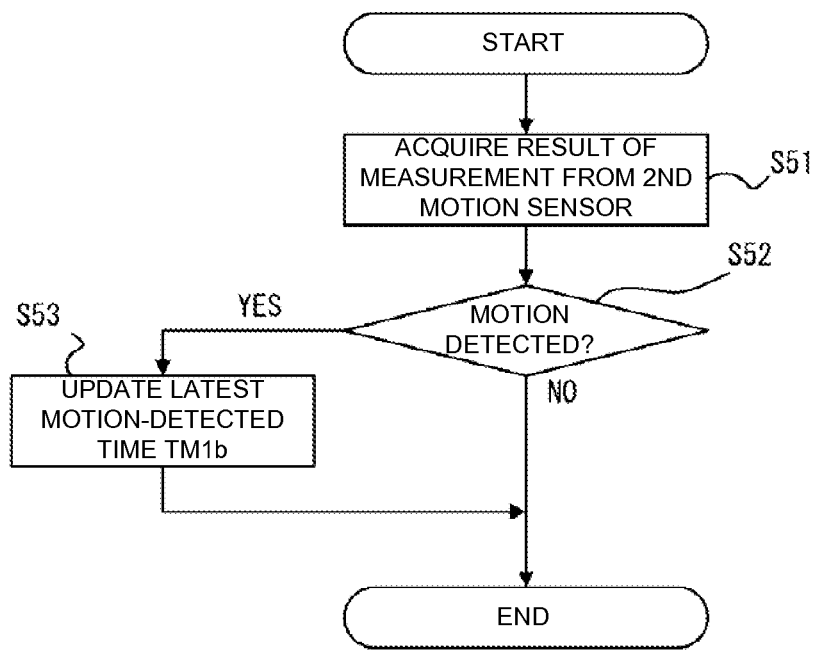
FIG. 13 is a flow chart for explaining an operation of the presence deciding apparatus in the fifth embodiment.

A flow chart in acquiring a value measured by the second motion sensor 12 is shown in FIG. 13.

Once the time deciding section 13 has acquired a value measured by the second motion sensor 12 (Step S51), it decides whether or not the acquired measured value is greater than a threshold value TH1 for motion detection, and in a case that the value is greater, the section 13 decides that motion is detected by the second motion sensor 12 (Step S52). The measured value for use in the decision here is, for example, a standard deviation of the values measured by the second motion sensor 12 within a predetermined period of time (such as 0.5 seconds).

In a case that motion is detected by the second motion sensor 12 (Step S52: YES), the time deciding section 13 updates a latest motion-detected time TM1$b$ for the second motion sensor 12 with the time, and stores the time (Step S53). In a case that no motion is detected by the second motion sensor 12 (Step S52: NO), the processing is then terminated.

A flow chart in acquiring a value measured by the first motion sensor 11 is shown in FIG. 14.

Once the time deciding section 13 has acquired a value measured by the first motion sensor 11 (Step S61), it compares the acquired measured value with a threshold value TH1 to decide about the presence of motion detected by the first motion sensor 11 (Step S62). The measured value for use in the decision here is, for example, a standard deviation of the values measured by the first motion sensor 11 within a predetermined period of time (such as 0.5 seconds).

In a case that motion is detected by the first motion sensor 11 (Step S62: YES), the time deciding section 13 updates a latest motion-detected time TM1$a$ for the first motion sensor 11 with the time, stores the time (Step S63), and stores in the storage section 512 and displays on the display device 52 a result of presence decision, "present" (Step S67).

In a case that no motion is detected by the first motion sensor 11 (Step S62: NO), the presence deciding section 14 decides whether a result of the preceding presence decision in this processing is "present" (Step S64).

In a case that the result of the preceding presence decision is "absent" (Step S64: NO), the presence deciding section 14 stores in the storage section 512 and displays on the display device 52 a result of presence decision, "absent" (Step S67).

In a case that the result of the preceding presence decision is "present" (Step S64: YES), the presence deciding section 14 calculates an elapsed time T5 which is a period of time from the latest motion-detected time TM1$a$ by the first motion sensor 11 to the time point of the processing, and decides whether or not the elapsed time T5 exceeds a preset timeout period T3 (Step S65).

In a case that the elapsed time T5 exceeds the timeout period T3 (Step S65: YES), the presence deciding section 14 stores in the storage section 512 and displays on the display device 52 a result of presence decision, "absent" (Step S67).

In a case that the elapsed time T5 does not exceed the timeout period T3 (Step S65: NO), the time deciding section 13 decides whether or not a time lag is equal to or greater than the threshold time T2, the time lag being obtained by subtracting the latest motion-detected time TM1$a$ for the first motion sensor 11 from the latest motion-detected time TM1$b$ for the second motion sensor 12 (Step S66). The presence deciding section 14 stores in the storage section 512 and displays on the display device 52 the result of the presence decision at Step S57 (Step S67).

As described above, according to the present embodiment, it is possible to decide whether or not a user is present around the front zone of the computer 51 with high precision.

It is also possible to implement the second through fourth embodiments by a computer program. In this case, a processor operated by a program stored in a program memory implements functions and operations similar to those in the embodiments described above. It is also possible to implement only part of the functions of the embodiments described above by a computer program.

Moreover, the first through fifth embodiments described above may be combined.

While the present invention has been described with reference to the preferred embodiments hereinabove, the present invention is not necessarily limited to these embodiments and may be practiced with several modifications within a scope of its technical concept.

The present application claims priority based on Japanese Patent Application No. 2009-287111 filed on Dec. 18, 2009, the disclosure of which is incorporated herein in its entirety.

Part or all of the embodiments above may be described as in Supplementary notes below, although not being limited thereto.

(Supplementary note 1) A presence deciding system characterized in comprising: a first motion sensor for detecting motion of a mobile object in a first area; a second motion sensor for detecting motion of a mobile object in a second area including said first area; a time deciding section for deciding whether or not a time lag is equal to or greater than a first threshold value, the time lag being a period of time from when a value measured by the first motion sensor reaches down to or below a predetermined value to when a value measured by the second motion sensor reaches down to or below a predetermined value; and a presence deciding section for deciding that no mobile object is present in said first area in a case that it is decided by said time deciding section that said time lag is equal to or greater than said first threshold value.

(Supplementary note 2) The presence deciding system as recited in Supplementary note 1, characterized in that: said presence deciding section decides that no mobile object is present in said first area in a case that it is decided by said time deciding section that said time lag is equal to or greater than said first threshold value before a predetermined timeout period has elapsed from a time at which the value measured by said first motion sensor reaches down to or below a predetermined value, and in a case that said timeout period has elapsed from a time at which the value measured by said first motion sensor reaches down to or below a predetermined value.

(Supplementary note 3) The presence deciding system as recited in Supplementary note 1 or 2, characterized in that: said presence deciding section decides that no mobile object is present in said first area in a case that the values measured by said first and second motion sensors are equal to or smaller than a predetermined value over a certain period of time after it is decided by said time deciding section that said time lag is equal to or greater than said first threshold value.

(Supplementary note 4) The presence deciding system as recited in any one of Supplementary notes 1 through 3, characterized in further comprising: a third motion sensor for detecting motion of a mobile object in a third area including said second area, and characterized in that: said time deciding section further decides whether or not a time lag is equal to or greater than a second threshold value, the time lag being a period of time from when a value measured by said first motion sensor reaches down to or below a predetermined value to when a value measured by said third motion sensor reaches down to or below a predetermined value, and said presence deciding section decides that no mobile object is present in said first area in a case that a result of the decision by said time deciding section indicates at least one of conditions that said time lag for said first and second areas is equal to or greater than said first threshold value and that said time lag for said first and third areas is equal to or greater than said second threshold value.

(Supplementary note 5) The presence deciding system as recited in any one of Supplementary notes 1 through 4, characterized in further comprising: an environmental sensor for performing measurement for correcting sensitivity variation of said motion sensors due to environmental factors; and a sensitivity correcting section for applying sensitivity correction to said motion sensors based on a result of the measurement by said environmental sensor.

(Supplementary note 6) The presence deciding system as recited in any one of Supplementary notes 1 through 5, characterized further comprising: a power source control section for disconnecting power source for at least one motion sensor except said first motion sensor in a case that it is decided by said presence deciding section that no mobile object is present in said first area.

(Supplementary note 7) A presence deciding apparatus characterized in comprising: a time deciding section for deciding whether or not a time lag is equal to or greater than a first threshold value, the time lag being a period of time from when a measured value indicating motion of a mobile object in a first area reaches down to or below a predetermined value to when a measured value indicating motion of a mobile object in a second area including said first area reaches down to or below a predetermined value; and a presence deciding section for deciding that no mobile object is present in said first area in a case that it is decided by said time deciding section that said time lag is equal to or greater than said first threshold value.

(Supplementary note 8) The presence deciding apparatus as recited in Supplementary note 7, characterized in that: said presence deciding section decides that no mobile object is present in said first area in a case that it is decided by said time deciding section that said time lag is equal to or greater than said first threshold value before a predetermined timeout period has elapsed from a time at which the measured value indicating motion in said first area reaches down to or below a predetermined value, and in a case said timeout period has elapsed from a time at which the measured value indicating motion in said first area reaches down to or below a predetermined value.

(Supplementary note 9) The presence deciding apparatus as recited in Supplementary notes 7 or 8, characterized in that: said presence deciding section decides that no mobile object is present in said first area in a case that the measured values for said first and second areas are equal to or smaller than a predetermined value over a certain period of time after it is decided by said time deciding section that said time lag is equal to or greater than said first threshold value.

(Supplementary note 10) The presence deciding apparatus as recited in any one of Supplementary notes 7 through 9, characterized in that: said time deciding section further decides whether or not a time lag is equal to or greater than a second threshold value, the time lag being a period of time from when the measured value indicating motion in said first area reaches down to or below a predetermined value to when a measured value indicating motion of a mobile object in a third area including said second area reaches down to or below a predetermined value, and said presence deciding section decides that no mobile object is present in said first area in a case that a result of the decision by said time deciding section indicates at least one of conditions that said time lag for said first and second areas is equal to or greater than said first threshold value and that said time lag for said first and third areas is equal to or greater than said second threshold value.

(Supplementary note 11) The presence deciding apparatus as recited in any one of Supplementary notes 7 through 10, characterized in further comprising: a sensitivity correcting section for applying sensitivity correction to motion sensors for detecting motion in said areas based on a result of measurement for correcting sensitivity variation of the motion sensors due to environmental factors.

(Supplementary note 12) The presence deciding apparatus as recited in any one of Supplementary notes 7 through 11, characterized in further comprising: a power source control section for disconnecting power source for at least one motion sensor except a motion sensor for detecting motion in said first area in a case that it is decided by said presence deciding section that no mobile object is present in said first area.

(Supplementary note 13) A presence deciding method characterized in comprising: deciding whether or not a time lag is equal to or greater than a first threshold value, the time lag being a period of time from when a measured value indicating motion of a mobile object in a first area reaches down to or below a predetermined value to when a measured value indicating motion of a mobile object in a second area including said first area reaches down to or below a predetermined value; and deciding that no mobile object is present in said first area in a case that it is decided that said time lag is equal to or greater than said first threshold value.

(Supplementary note 14) The presence deciding method as recited in Supplementary note 13, characterized in comprising: deciding that no mobile object is present in said first area in a case that it is decided that said time lag is equal to or greater than said first threshold value before a predetermined timeout period has elapsed from a time at which the measured value indicating motion in said first area reaches down to or below a predetermined value, and in a case that said timeout period has elapsed from a time at which the measured value indicating motion in said first area reaches down to or below a predetermined value.

(Supplementary note 15) The presence deciding method as recited in Supplementary note 13 or 14, characterized in comprising: deciding that no mobile object is present in said first area in a case that the measured values for said first and second areas are equal to or smaller than a predetermined value over a certain period of time after it is decided that said time lag is equal to or greater than said first threshold value.

(Supplementary note 16) The presence deciding method as recited in any one of Supplementary notes 13 through 15, characterized in further comprising: deciding whether or not a time lag is equal to or greater than a second threshold value, the time lag being a period of time from when the measured value indicating motion in said first area reaches down to or below a predetermined value to when a measured value indicating motion of a mobile object in a third area including said second area reaches down to or below a predetermined value; and deciding that no mobile object is present in said first area in a case that a result of the decision is obtained indicating at least one of conditions that said time lag for said first and second areas is equal to or greater than said first threshold value and that said time lag for said first and third areas is equal to or greater than said second threshold value.

(Supplementary note 17) The presence deciding method as recited in any one of Supplementary notes 13 through 16, characterized in comprising: applying sensitivity correction to motion sensors for detecting motion in said areas based on a result of measurement for correcting sensitivity variation of the motion sensors due to environmental factors.

(Supplementary note 18) The presence deciding method as recited in any one of Supplementary notes 13 through 17, characterized in comprising: disconnecting power source for at least one motion sensor except a motion sensor for detecting motion in said first area in a case that it is decided that no mobile object is present in said first area.

(Supplementary note 19) A program for causing a computer connected with a first motion sensor for detecting motion of a mobile object in a first area and a second motion sensor for detecting motion of a mobile object in a second area including said first area to implement: a time deciding function for deciding whether or not a time lag is equal to or greater than a first threshold value, the time lag being a period of time from when a value measured by the first motion sensor reaches down to or below a predetermined value to when a value measured by the second motion sensor reaches down to or below a predetermined value; and a presence deciding function for deciding that no mobile object is present in said first area in a case that it is decided by said time deciding function that said time lag is equal to or greater than said first threshold value.

(Supplementary note 20) The program as recited in Supplementary note 19, characterized in that: said presence deciding function decides that no mobile object is present in said first area in a case that it is decided by said time deciding function that said time lag is equal to or greater than said first threshold value before a predetermined timeout period has elapsed from a time at which the measured value indicating motion in said first area reaches down to or below a predetermined value, and in a case that said timeout period has elapsed from a time at which the measured value indicating motion in said first area reaches down to or below a predetermined value.

(Supplementary note 21) The program as recited in Supplementary note 19 or 20, characterized in that: said presence deciding function decides that no mobile object is present in said first area in a case that the measured values for said first and second areas are equal to or smaller than a predetermined value over a certain period of time after it is decided by said time deciding function that said time lag is equal to or greater than said first threshold value.

(Supplementary note 22) The program as recited in any one of Supplementary notes 19 through 21, characterized in that: said time deciding function further decides whether or not a time lag is equal to or greater than a second threshold value, the time lag being a period of time from when the measured value indicating motion in said first area reaches down to or below a predetermined value to when a measured value indicating motion of a mobile object in a third area including said second area reaches down to or below a predetermined value, and said presence deciding function decides that no mobile object is present in said first area in a case that a result of the decision by said time deciding function indicates at least one of conditions that said time lag for said first and second areas is equal to or greater than said first threshold value and that said time lag for said first and third areas is equal to or greater than said second threshold value.

(Supplementary note 23) The program as recited in any one of Supplementary notes 19 through 22, for further implementing: a sensitivity correcting function for applying sensitivity correction to motion sensors for detecting motion in said areas based on a result of measurement for correcting sensitivity variation of the motion sensors due to environmental factors.

(Supplementary note 24) The program as recited in any one of Supplementary notes 19 through 23, for further implementing: a power source control function for disconnecting power source for at least one motion sensor except a motion sensor for detecting motion in said first area in a case that it is decided by said presence deciding function that no mobile object is present in said first area.

REFERENCE SIGNS LIST

11 First motion sensor
12 Second motion sensor
13 Time deciding section
14 Presence deciding section
21 Third motion sensor
31 Environmental sensor
32 Sensitivity correcting section
41 Power source control section
44 Presence deciding section
51 Computer
52 Display device
511 Storage section
512 Control section

The invention claimed is:
1. A presence deciding apparatus comprising:
a processor; and
a storage, having stored thereon a program that, when executed by the processor, instructs the processor to implement:
a time deciding unit configured to calculate a first time lag, which is a period of time from a time when a first measured value indicating motion of a mobile object in a first area obtained by a first motion sensor is less than or equal to a first predetermined value to a time when a second measured value indicating motion of the mobile object in a second area obtained by a second motion sensor including said first area is less than or equal to a second predetermined value, and to decide whether the first time lag is greater than or equal to a first threshold value; and
a presence deciding unit configured to decide that no mobile object is present in said first area in response to said time deciding unit deciding that said first time lag is greater than or equal to said first threshold value.
2. The presence deciding apparatus according to claim 1, wherein said presence deciding unit is further configured to decide, in response to at least one of said time deciding unit deciding that said first time lag is greater than or equal to said first threshold value before a predetermined timeout period has elapsed from the time when the first measured value is less than or equal to the first predetermined value and said predetermined timeout period elapsing from the time when the first measured value is less than or equal to the first predetermined value, that no mobile object is present in said first area.

3. The presence deciding apparatus according to claim 1, wherein said presence deciding unit is further configured to, in response to the first and second measured values for said first and second areas being less than or equal to a third predetermined value over a certain period of time after said time deciding unit decides that said first time lag is greater than or equal to said first threshold value, decide that no mobile object is present in said first area.

4. The presence deciding apparatus according to claim 1, wherein
said time deciding unit is further configured to decide whether second time lag is greater than or equal to a second threshold value, the second time lag being a period of time from the time when the first measured value is less than or equal to the first predetermined value to a time when a measured value indicating motion of the mobile object in a third area including said second area obtained by a third motion sensor is less than or equal a third predetermined value, and
said presence deciding unit is further configured to decide, in response to said time deciding unit deciding that at least one of said first time lag is greater than or equal to said first threshold value and said second time lag is greater than or equal to said second threshold value, that no mobile object is present in said first area.

5. The presence deciding apparatus according to claim 4, wherein the program, when executed by the processor, is further configured to instruct the processor to implement a sensitivity correcting unit configured to correct a sensitivity of the first and second motion sensors that detect motion in said first and second areas, respectively, based on a measurement result for correcting a sensitivity variation of the motion sensors due to environmental factors obtained by an environmental sensor.

6. The presence deciding apparatus according to claim 1, wherein the program, when executed by the processor, is further configured to instruct the processor to implement a power source controller configured to disconnect, in response to said presence deciding unit deciding that no mobile object is present in said first area, a power source for at least one motion sensor not including the first motion sensor.

7. A presence deciding system comprising:
a first motion sensor configured to detect motion of a mobile object in a first area;
a second motion sensor configured to detect motion of a mobile object in a second area including said first area;
a processor; and
a storage, having stored thereon a program that, when executed by the processor, instructs the processor to implement:
a time deciding unit configured to calculate a first time lag, which is a period of time from a time when a first value measured by the first motion sensor is less than or equal to a first predetermined value to a time when a second value measured by the second motion sensor is less than or equal to a second predetermined value, and to decide whether the first time lag is greater than or equal to a first threshold value; and
a presence deciding unit configured to decide, in response to said time deciding unit deceiving that said first time lag is greater than or equal to said first threshold value, that no mobile object is present in said first area.

8. A presence deciding method of a processor programmed to perform the presence deciding method, the presence deciding method comprising:
calculating a first time lag, which is a period of time from a time when a first measured value indicating motion of a mobile object in a first area obtained by a first motion sensor is less than or equal to a first predetermined value to a time when a second measured value indicating motion of the mobile object in a second area including said first area obtained by a second motion sensor is less than or equal to a second predetermined value;
deciding whether the first time lag is greater than or equal to a first threshold value; and
deciding, in response to deciding that the first time lag is greater than or equal to the first threshold value, that no mobile object is present in said first area.

9. A non-transitory computer readable storage medium storing a program that, when executed on a computer connected with a first motion sensor for detecting motion of a mobile object in a first area and a second motion sensor for detecting motion of the mobile object in a second area including said first area, causes said computer to implement:
a time deciding function for calculating a first time lag, which is a period of time from a time when a first value measured by the first motion sensor is less than or equal to a first predetermined value to a time when a second value measured by the second motion sensor is less than or equal to a second predetermined value, and decide whether the first time lag is greater than or equal to a first threshold value; and
a presence deciding function for deciding, in response to said time deciding unit deceiving that said first time lag is greater than or equal to said first threshold value, that no mobile object is present in said first area.

10. The presence deciding method according to claim 8, further comprising:
deciding, in response to at least one of deciding that said first time lag is greater than or equal to said first threshold value before a predetermined timeout period has elapsed from the time when the first measured value is less than or equal to the first predetermined value and said predetermined timeout period elapsing from the time when the first measured value is less than or equal to the first predetermined value, that no mobile object is present in said first area.

11. The presence deciding method according to claim 8, comprising:
deciding, in response to the first and second measured values for said first and second areas being less than or equal to a third predetermined value over a certain period of time after deciding that said first time lag is greater than or equal to said first threshold value, that no mobile object is present in said first area.

12. The presence deciding method according to claim 8, further comprising:
deciding whether a second time lag is greater than or equal to a second threshold value, the second time lag being a period of time from the time when the first measured value indicating motion in said first area is less than or equal to the first predetermined value to a time when a third measured value indicating motion of the mobile object in a third area including said second area obtained by a third motion sensor is less than or equal a third predetermined value; and
deciding, in response to deciding that at least one of said first time lag is greater than or equal to said first threshold value and said second time lag is greater than or equal to said second threshold value, that no mobile object is present in said first area.

13. The presence deciding method according to claim 8, comprising:
correcting a sensitivity of the first and second motion sensors that detect motion in said first and second areas, respectively, based on a measurement result for correcting a sensitivity variation of the motion sensors due to environmental factors obtained by an environmental sensor.

14. The presence deciding method according to claim 8, comprising:
disconnecting, in response to deciding that no mobile object is present in said first area, a power source for at least one motion sensor not including the first motion sensor.

15. The non-transitory computer readable storage medium storing a program according to claim 9, wherein said presence deciding function decides, in response to at least one of said time deciding function deciding that said first time lag is greater than or equal to said first threshold value before a predetermined timeout period has elapsed from the time when the first measured value is less than or equal to the first predetermined value and said predetermined timeout period elapsing from the time when the first measured value is less than or equal to the first predetermined value, that no mobile object is present in said first area.

16. The non-transitory computer readable storage medium storing a program according to claim 9, wherein said presence deciding function decides, in response to the first and second measured values for said first and second areas being less than or equal to a third predetermined value over a certain period of time after said time deciding function decides that said first time lag is greater than or equal to said first threshold value, that no mobile object is present in said first area.

17. The non-transitory computer readable storage medium storing a program according to claim 9, wherein
said time deciding function further decides whether a second time lag is greater than or equal to a second threshold value, the second time lag being a period of time from the time when the first measured value is less than or equal to the first predetermined value to a time when a measured value indicating motion of the mobile object in a third area including said second area obtained by a third motion sensor is less than or equal a third predetermined value, and
said presence deciding function decides, in response to said time deciding function deciding that at least one of said first time lag is greater than or equal to said first threshold value and said second time lag is greater than or equal to said second threshold value, that no mobile object is present in said first area.

18. The non-transitory computer readable storage medium storing a program according to claim 9, that, when executed on said computer, causes said computer to further implement a sensitivity correcting function for correcting a sensitivity of the first and second motion sensors that detect motion in said first and second areas, respectively, based on a measurement result for correcting a sensitivity variation of the first and second motion sensors due to environmental factors obtained by an environmental sensor.

19. The non-transitory computer readable storage medium storing a program according to claim 9, that, when executed on said computer, causes said computer to further implement a power source control function for disconnecting, in response to said presence deciding unit deciding that no mobile object is present in said first area, a power source for at least one motion sensor not including the first motion sensor.

* * * * *